US012510298B2

(12) United States Patent
Schlumm et al.

(10) Patent No.: US 12,510,298 B2
(45) Date of Patent: Dec. 30, 2025

(54) HEAT EXCHANGE AND FLAME ARREST

(71) Applicant: Hewlett-Packard Development Company, L.P., Spring, TX (US)

(72) Inventors: Doron Schlumm, Ness Ziona (IL); Mark Sandler, Ness Ziona (IL); Peter Nedelin, Ness Ziona (IL); Assaf Pines, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 208 days.

(21) Appl. No.: 18/549,636

(22) PCT Filed: Mar. 11, 2021

(86) PCT No.: PCT/US2021/021883

§ 371 (c)(1),
(2) Date: Sep. 8, 2023

(87) PCT Pub. No.: WO2022/191845

PCT Pub. Date: Sep. 15, 2022

(65) Prior Publication Data

US 2024/0151473 A1 May 9, 2024

(51) Int. Cl.

*F28D 7/02* (2006.01)
*F28D 1/047* (2006.01)
*F28F 1/32* (2006.01)
*G03G 21/20* (2006.01)

(52) U.S. Cl.

CPC ................ *F28D 1/047* (2013.01); *F28F 1/32* (2013.01); *G03G 21/206* (2013.01)

(58) Field of Classification Search

CPC ........... F28D 1/047; F28F 1/32; G03G 21/206
USPC .......................................................... 165/165
See application file for complete search history.

(56) References Cited

U.S. PATENT DOCUMENTS

| | | | |
|---|---|---|---|
| 4,150,495 | A | 4/1979 | Stern |
| 4,545,360 | A | 10/1985 | Smith et al. |
| 5,097,764 | A | 3/1992 | Waizmann |
| 5,799,725 | A | 9/1998 | Bradley et al. |
| 6,378,605 | B1 | 4/2002 | Kutscher et al. |
| 6,581,928 | B1 | 6/2003 | Stephan |

(Continued)

FOREIGN PATENT DOCUMENTS

| | | | |
|---|---|---|---|
| DE | 1942299 | A1 | 2/1972 |
| EP | 1748259 | A1 | 1/2007 |

(Continued)

*Primary Examiner* — Davis D Hwu
(74) *Attorney, Agent, or Firm* — Jordan IP Law, LLC

(57) ABSTRACT

In an example of the disclosure, a heat exchange and flame arrest device for use with a subject gas includes tubing arranged to traverse a core, with the tubing defining a cooling fluid pathway. The core includes a gas flow inlet, a set of cooling fins, and a gas flow outlet. The gas flow inlet, the set of cooling fins, and the gas flow outlet collectively form a gas flow pathway for a subject gas. Each cooling fin of the set is positioned to form a gap between that cooling fin and an adjacent cooling fin. The gas flow inlet is to receive the subject gas. The combination of the gap between each cooling fin of the set and the cooling capacity of the cooling fluid pathway is sufficient to, if the subject gas has ignited, lower temperature of the subject gas to below autoignition temperature.

17 Claims, 16 Drawing Sheets

(56) References Cited

U.S. PATENT DOCUMENTS

| | | | |
|---|---|---|---|
| 8,256,212 | B2 | 9/2012 | Miretti |
| 8,550,151 | B2 | 10/2013 | Murayama et al. |
| 8,955,948 | B2 | 2/2015 | Rolland |
| 8,989,617 | B2 | 3/2015 | Shalem et al. |
| 9,046,872 | B2 | 6/2015 | Ikeda et al. |
| 9,656,493 | B2 | 5/2017 | Bildstein et al. |
| 9,673,370 | B2 | 6/2017 | Kim |
| 2003/0106677 | A1 | 6/2003 | Memory et al. |
| 2005/0217523 | A1 | 10/2005 | Hachmann et al. |
| 2008/0084465 | A1 | 4/2008 | Telken et al. |
| 2012/0102974 | A1 | 5/2012 | Kawazoe et al. |
| 2021/0047774 | A1 | 2/2021 | Han et al. |

FOREIGN PATENT DOCUMENTS

| | | | | |
|---|---|---|---|---|
| JP | H11303689 | A | * | 11/1999 |
| WO | 2013/137847 | A1 | | 9/2013 |
| WO | 2020/060528 | A1 | | 3/2020 |
| WO | 2020/101655 | A1 | | 5/2020 |
| WO | 2020/242500 | A1 | | 12/2020 |

* cited by examiner

HEAT EXCHANGE AND FLAME ARREST

BACKGROUND

A printer may apply print agents to a paper or another substrate. One example of a printer is a Liquid Electro-Photographic ("LEP") printer, which may be used to print using a fluid print agent such as an electrostatic printing fluid. Such electrostatic printing fluid includes electrostatically charged or chargeable particles (for example, resin or toner particles which may be colorant particles) dispersed or suspended in a carrier fluid).

DRAWINGS

FIGS. 4A, 4B, 4C, and 4D are simple schematic diagrams that illustrate examples of a heat exchange and flame arrest device.

Figure 5:
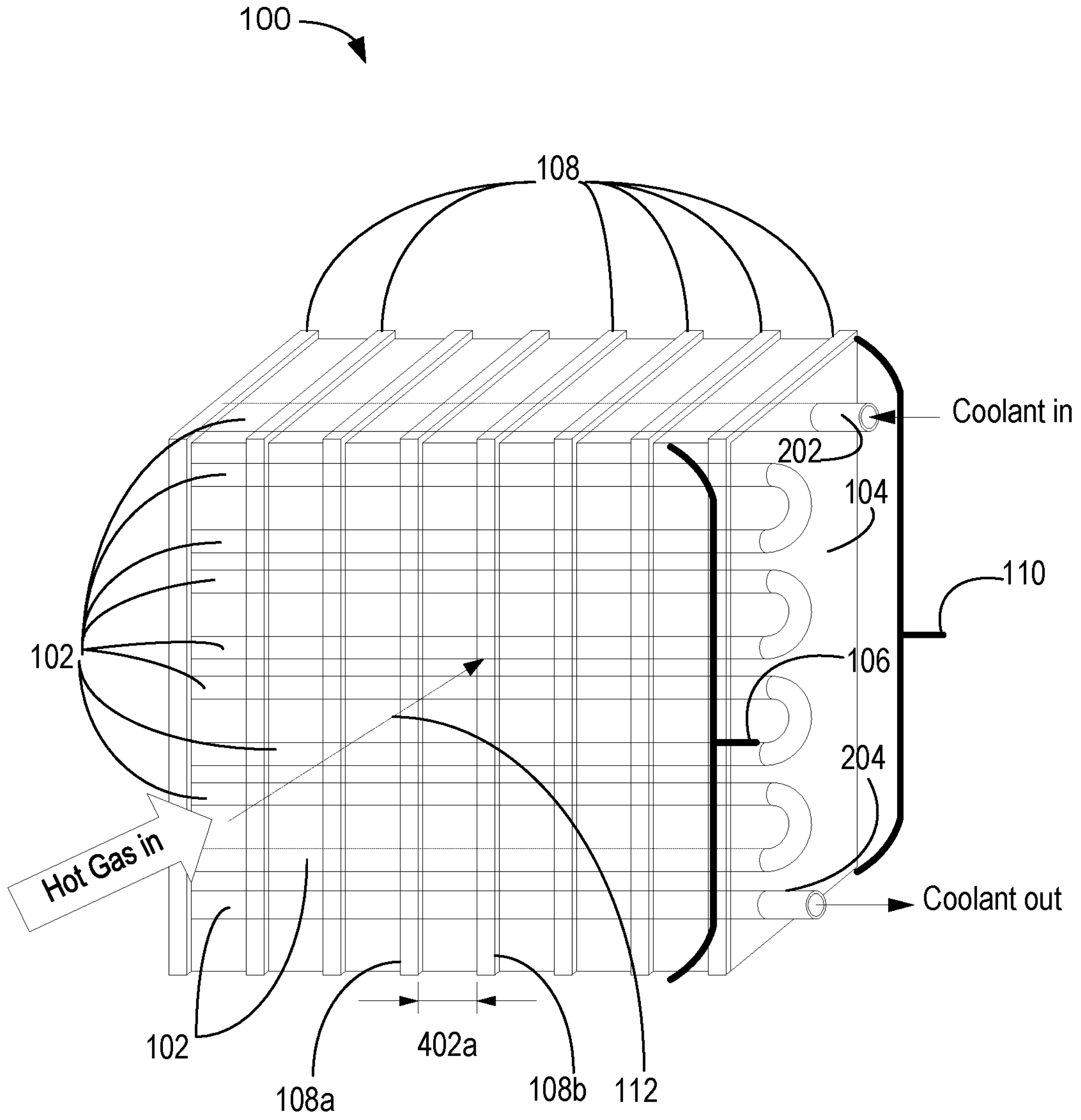

FIG. 5 is a simple schematic diagram that illustrates an example of a heat exchange and flame arrest device.

Figure 6:
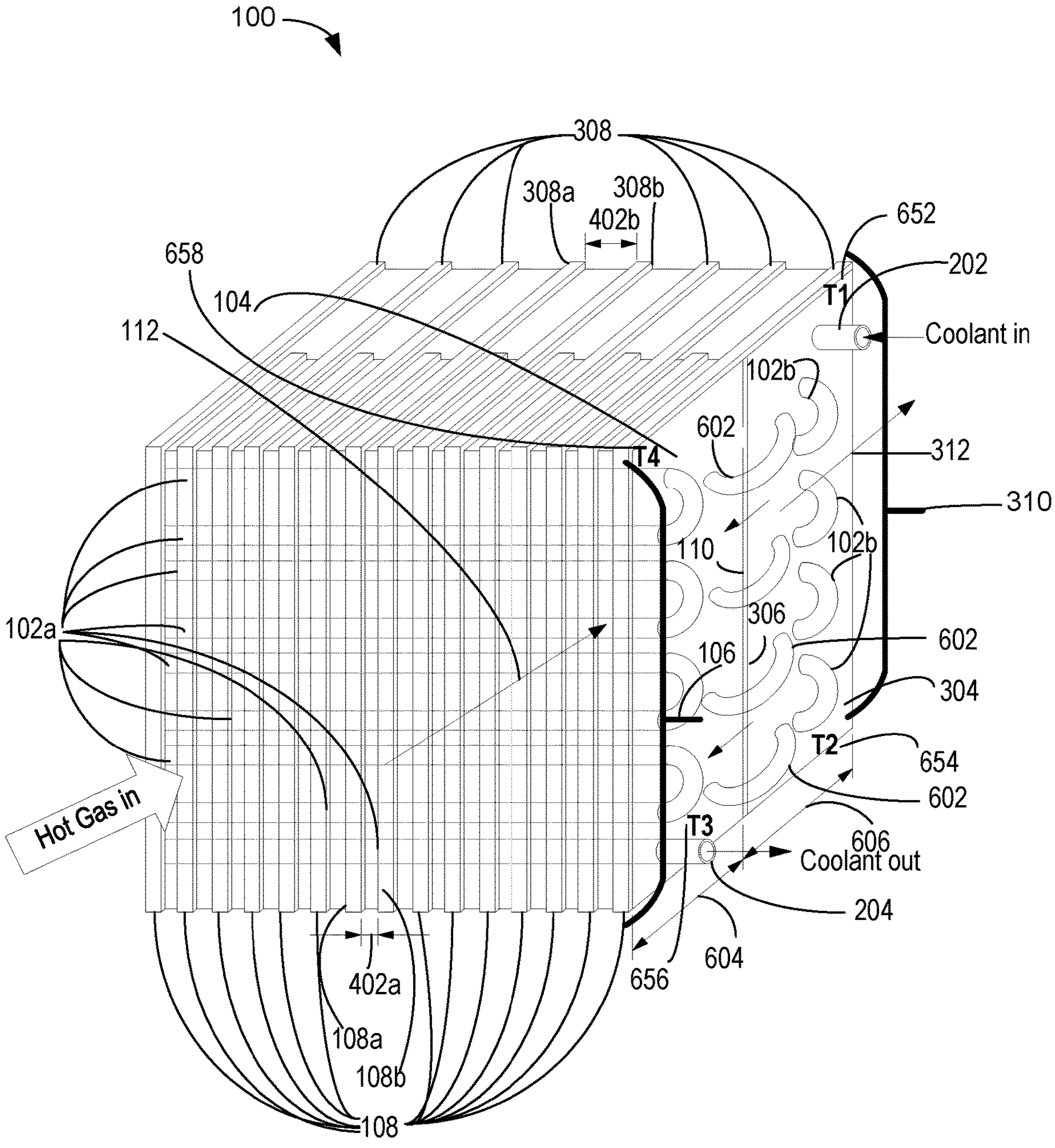

FIG. 6 is a simple schematic diagram that illustrates another example of a heat exchange and flame arrest device.

Figure 7:
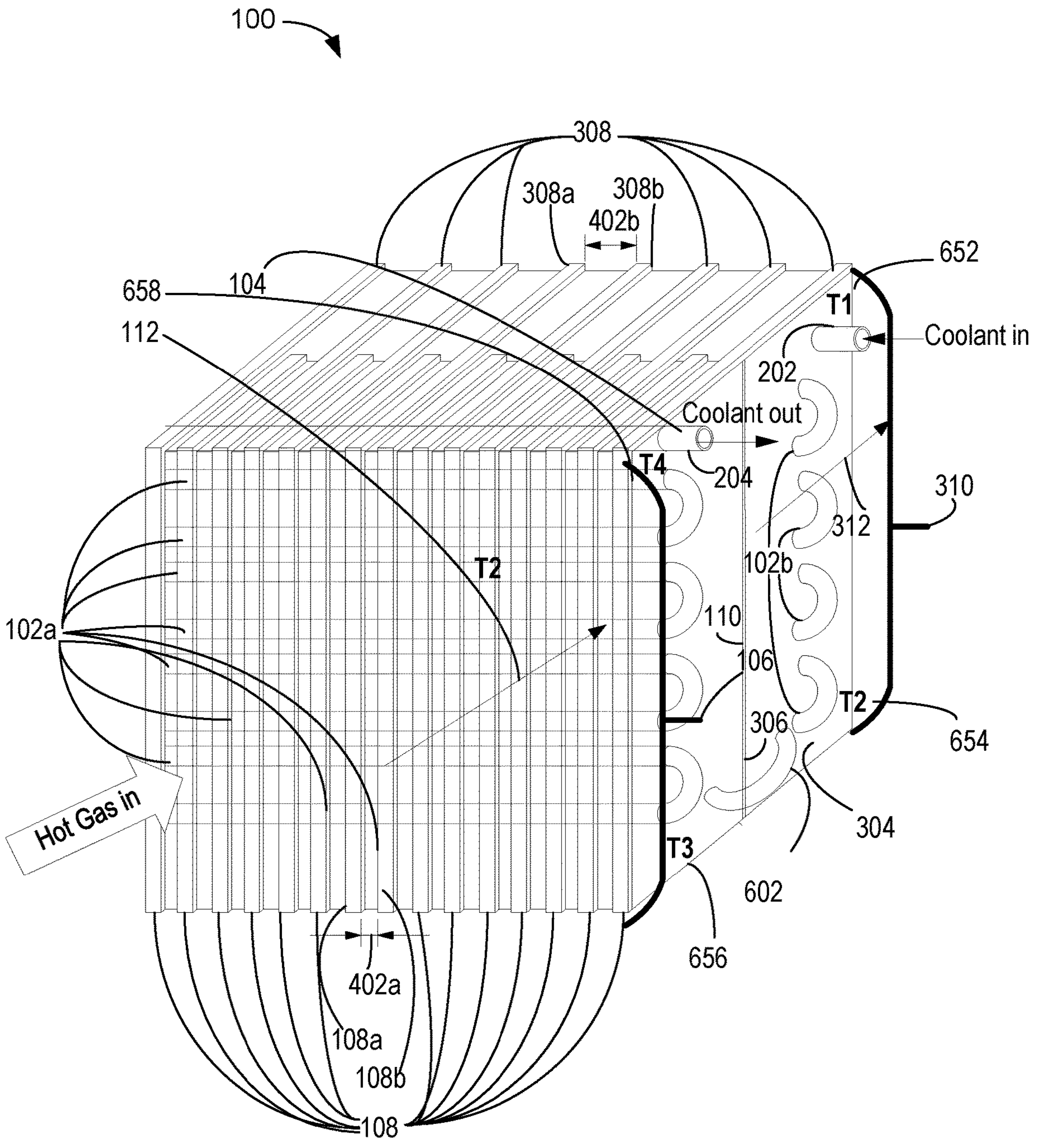

FIG. 7 is a simple schematic diagram that illustrates another example of a heat exchange and flame arrest device.

Figure 8:
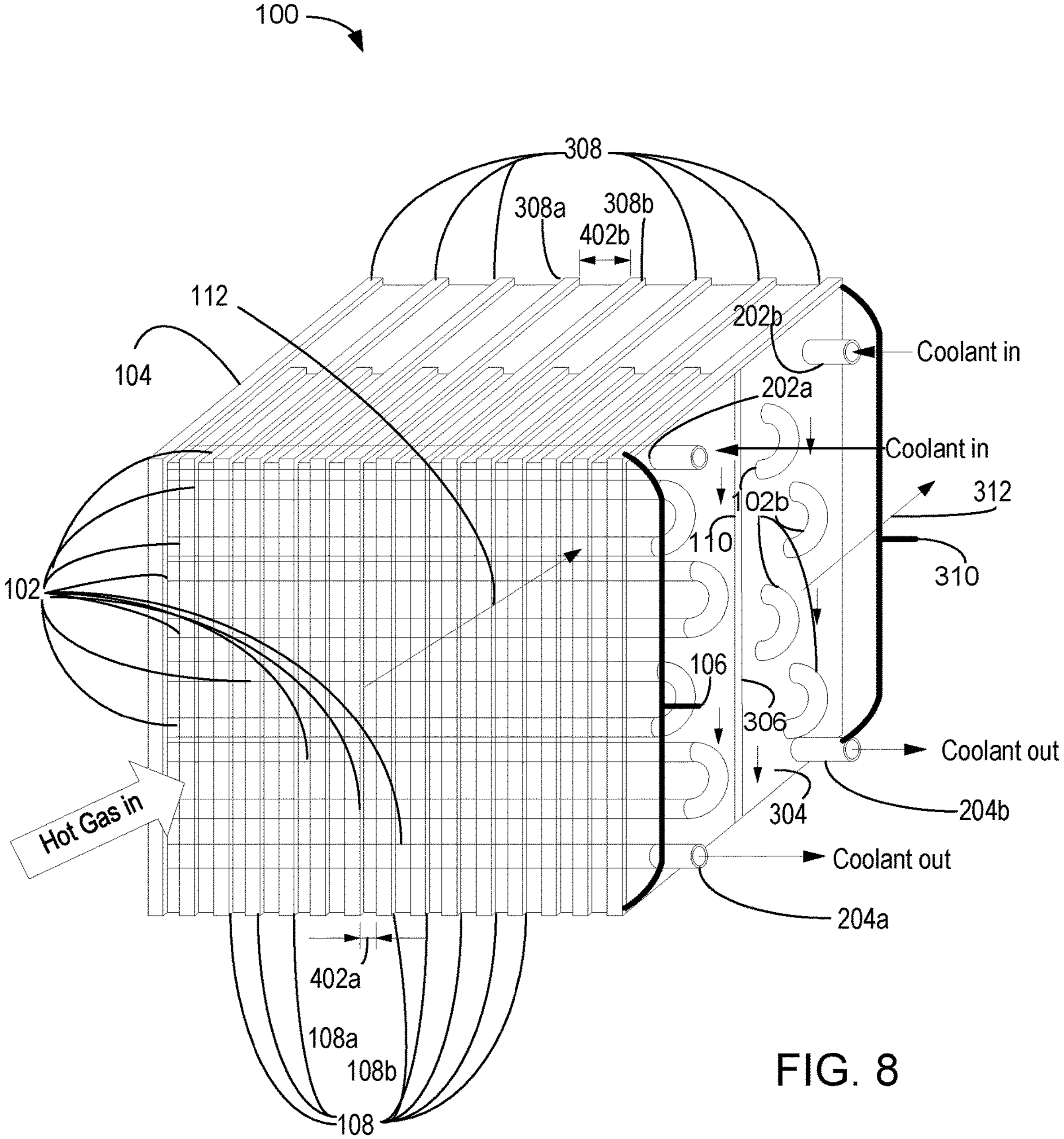

FIG. 8 is a simple schematic diagram that illustrates another example of a heat exchange and flame arrest device.

Figure 9:
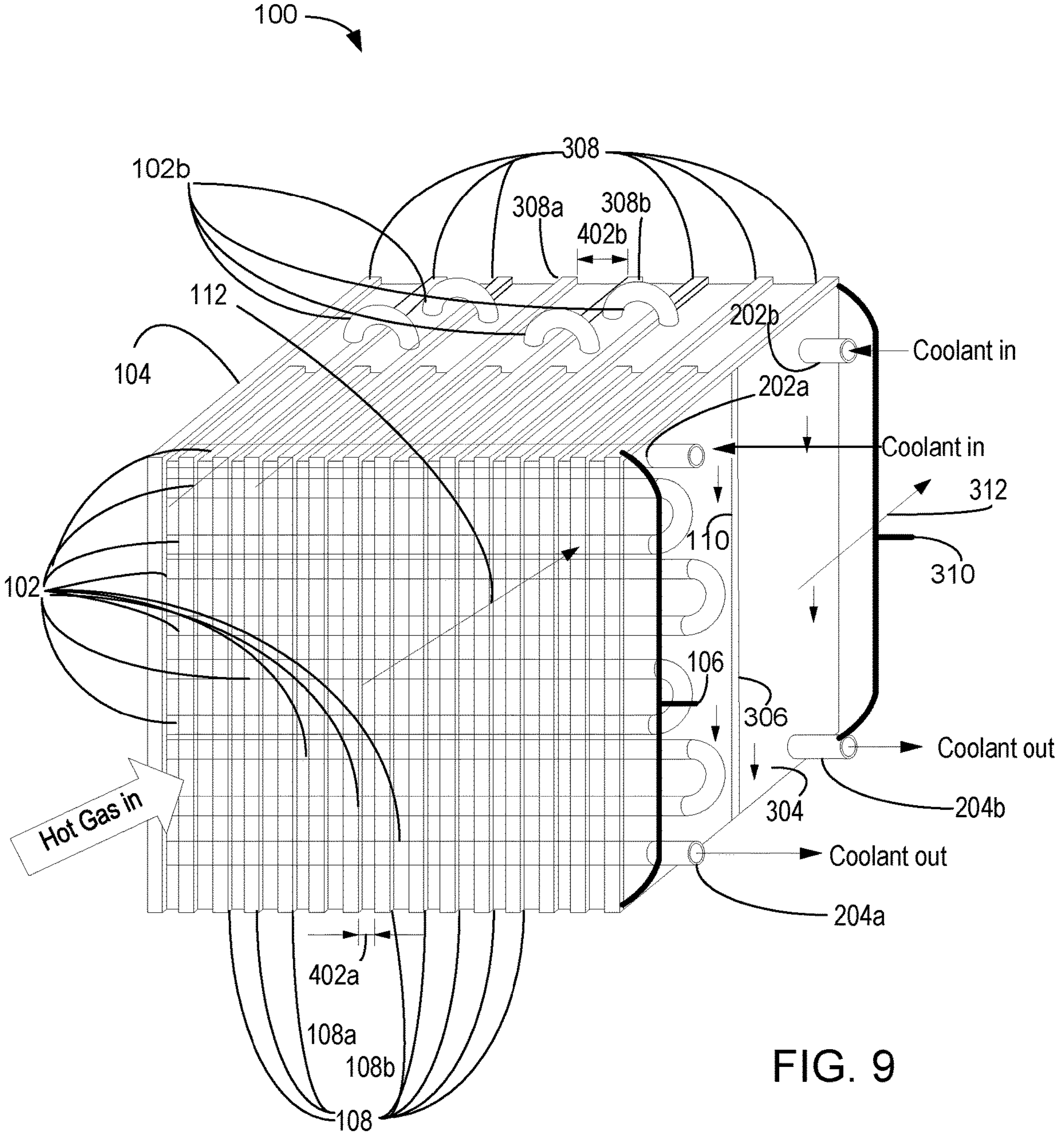

FIG. 9 is a simple schematic diagram that illustrates another example of a heat exchange and flame arrest device.

Figure 10:
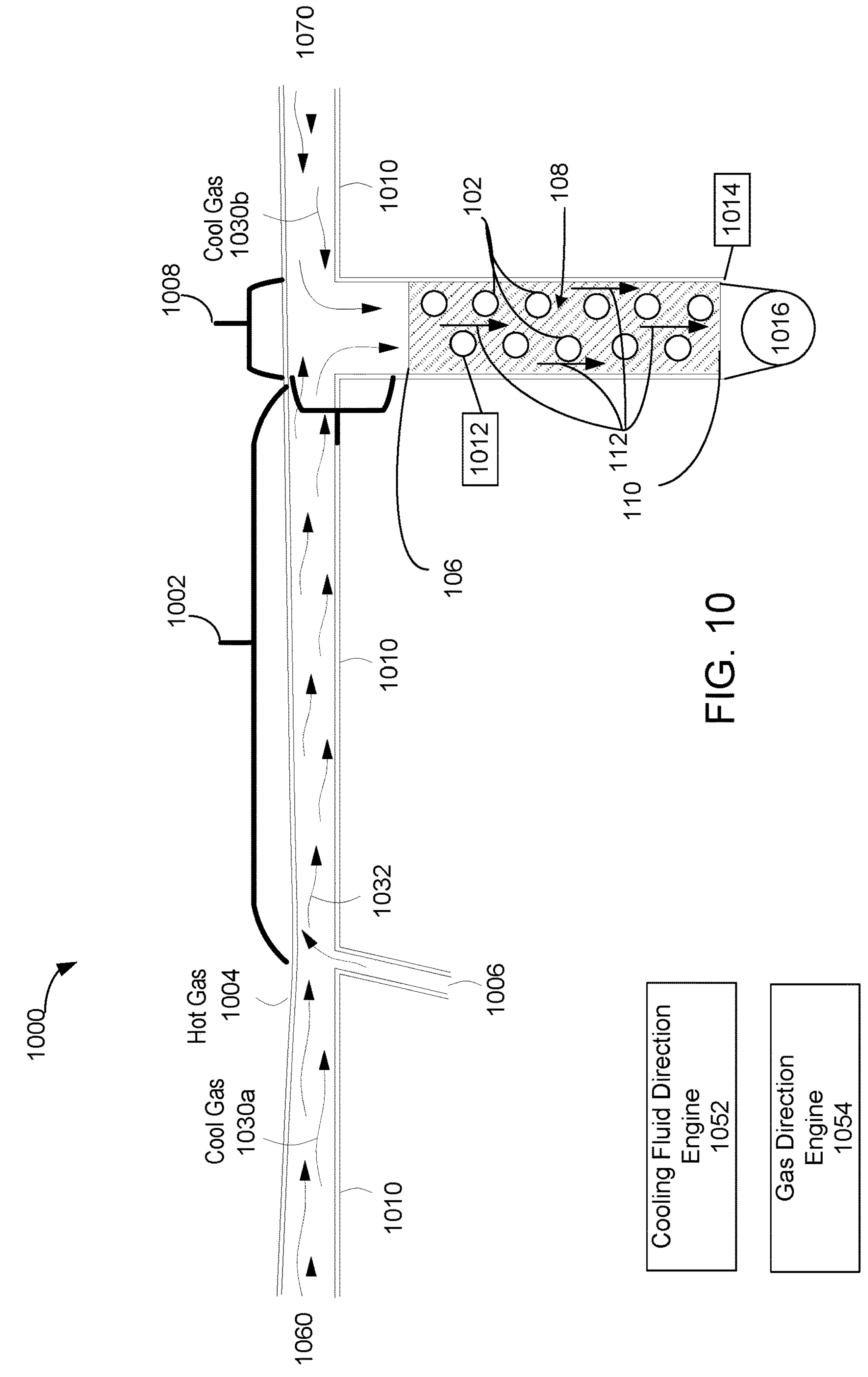

FIG. 10 is a simple schematic diagram that illustrates an example of a gas evacuation system, including a heat exchange and flame arrest device, for a printing system.

Figure 11:
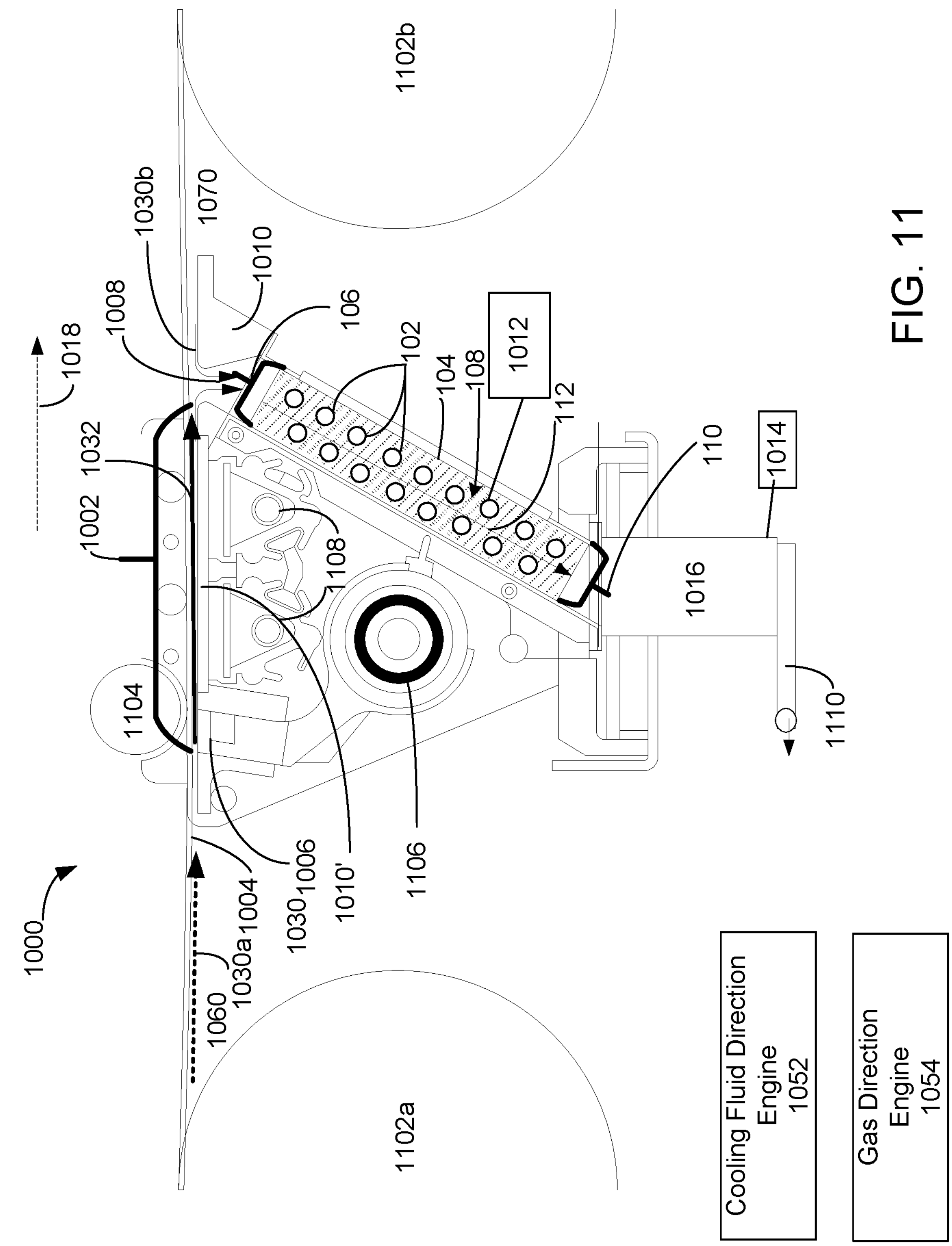

FIG. 11 is a simple schematic diagram that illustrates another example of a gas evacuation system, including a heat exchange and flame arrest device, for a printing system.

Figure 12:
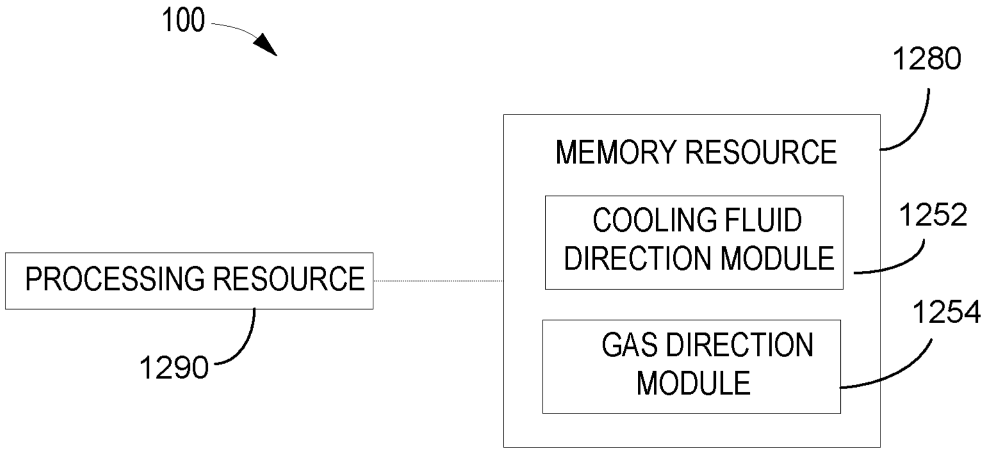

FIG. 12 is a block diagram depicting a memory resource and a processing resource to implement an example of a method for providing heat exchange and flame arrest for a subject gas.

Figure 13:
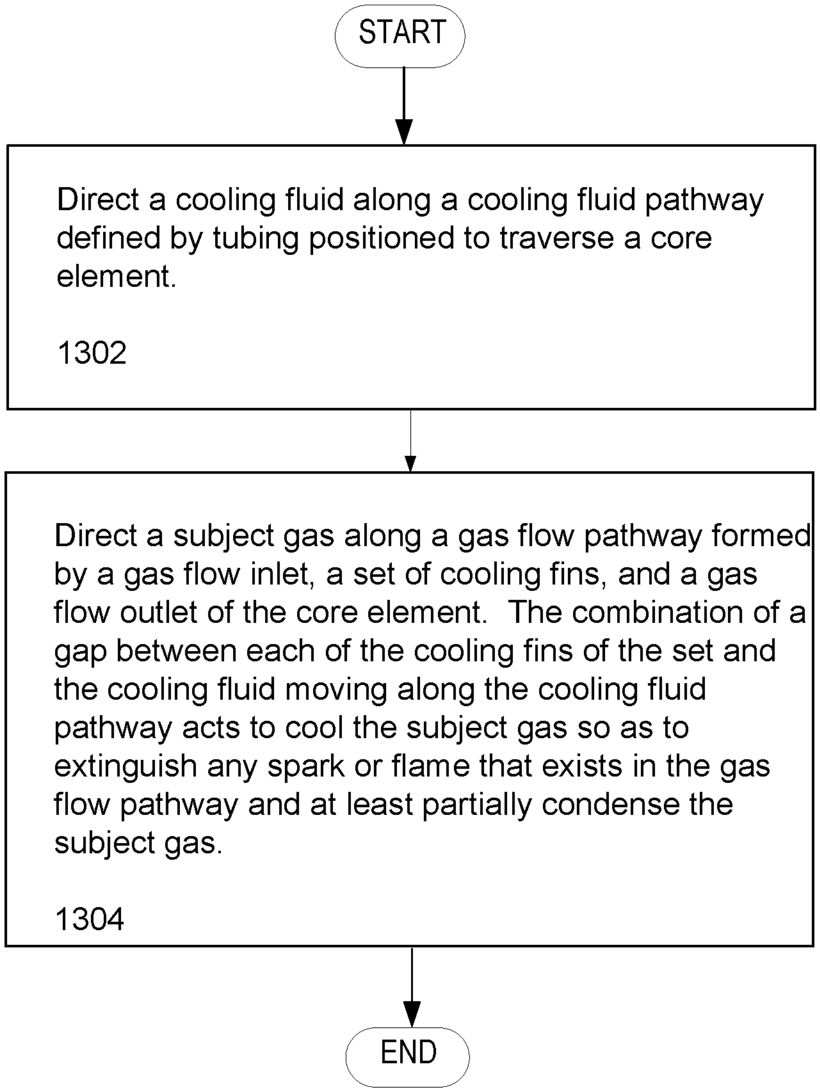

FIG. 13 is a flow diagram depicting an example implementation of a method for providing heat exchange and flame arrest for a subject gas.

Figure 14:
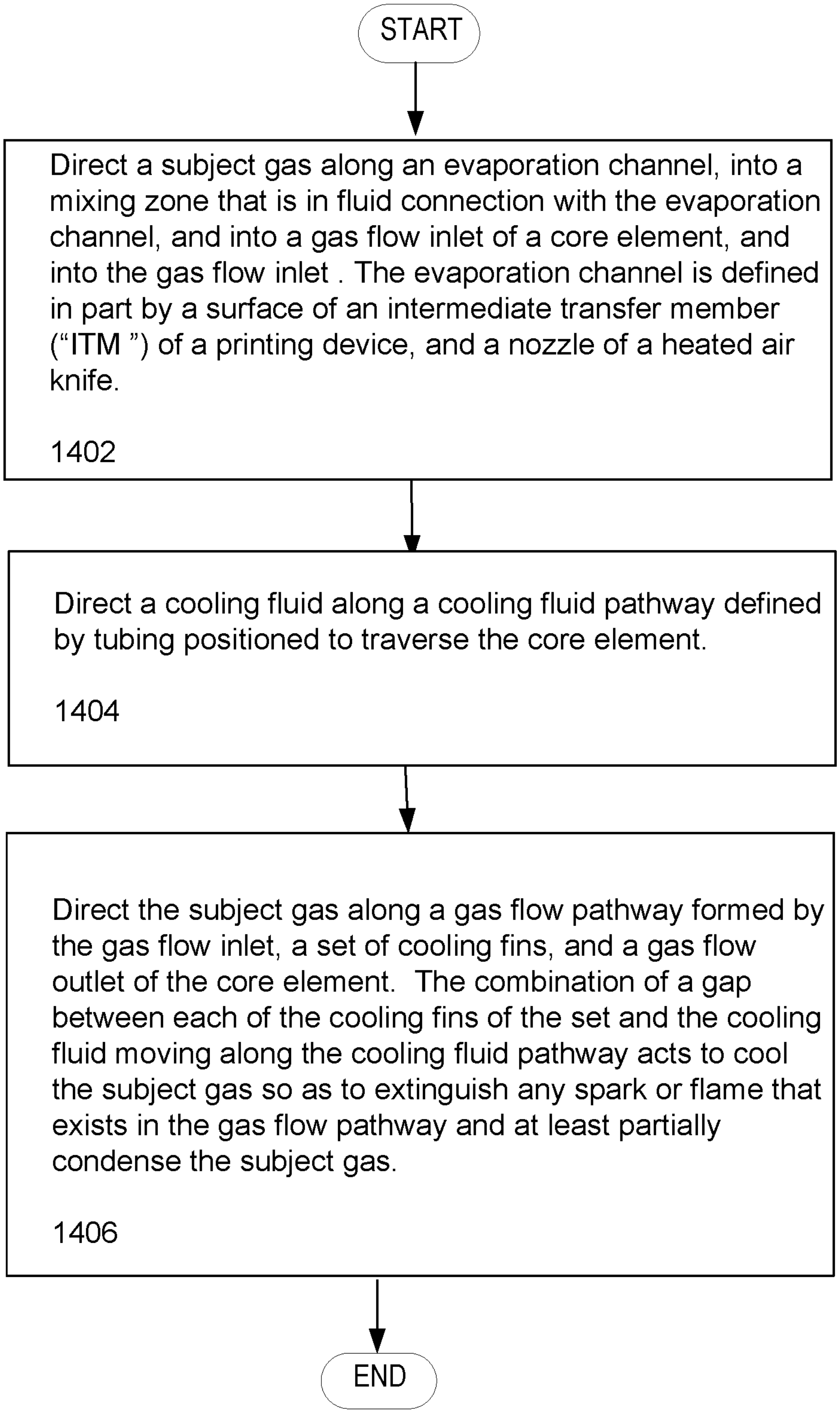

FIG. 14 is a flow diagram depicting another example implementation of a method for providing heat exchange and flame arrest for a subject gas.

DETAILED DESCRIPTION

In an example of LEP printing, a printer system may form an image on a print substrate by placing an electrostatic charge on a photoconductive element, and then utilizing a laser scanning unit to apply an electrostatic pattern of the desired image on the photoconductive element to selectively discharge the photoconductive element. The selective discharging forms a latent electrostatic image on the photoconductive element. The printer system includes a development station to develop the latent image into a visible image by applying a thin layer of electrostatic print fluid (which may be generally referred to as "LEP print fluid", or "electronic print fluid", "LEP ink", or "electronic ink" in some examples) to the patterned photoconductive element. Charged particles (sometimes referred to herein as "print fluid particles" or "colorant particles") in the LEP print fluid adhere to the electrostatic pattern on the photoconductive element to form a print fluid image. In examples, the print fluid image, including colorant particles and carrier fluid, is transferred utilizing a combination of heat and pressure from the photoconductive element to an intermediate transfer member (sometimes referred herein as an "ITM" or a "blanket") attached to a rotatable ITM drum or ITM belt. The ITM is heated until carrier fluid evaporates, and colorant particles melt, and a resulting molten film representative of the image is then applied to the surface of the print substrate via pressure and tackiness. In examples, the ITM that is attached to the ITM drum or ITM belt is a consumable or replaceable ITM.

In examples, the LEP print fluid may include a carrier fluid that is a synthetic isoparaffinic hydrocarbon solvent. During the heating of the ITM to melt the LEP print fluid to form a molten film, carrier fluid is evaporated from the LEP print fluid. In examples, the evaporated carrier fluid is directed away from the ITM and cooled, such that some of the carrier fluid may condense and reused at the press for another print job. In LEP printing the printing device is tasked to handle the carrier fluid vapor that results from carrier fluid evaporation in a manner that is safe and friendly to the environment.

In certain examples, the LEP printing device may include a set of developer units for applying various colors of LEP print fluid to a single photoconductive element, wherein the photoconductive element is to apply the color separations to form a color image on an ITM attached to a drum. Such LEP printing devices may employ a carrier fluid vapor dilution system that controls the carrier fluid vapor fluid concentration in the exhaust such that the highest concentration does not exceed a published ¼ LEL (Lower Explosion Limit) level for the carrier fluid. Some such LEP presses may control the carrier fluid concentration, e.g., by diluting the carrier fluid vapor evaporated from the ITM with a fresh air.

In other examples, an LEP printing device may include a heated ITM belt that is wrapped around transport rollers, with multiple photoconductive elements 1-n positioned to engage and disengage from the ITM to apply different colors 1-n of LEP print fluid to the ITM belt. In examples, each of the photoconductive elements 1-n has a dedicated developer unit that is to apply a color of colors 1-n of LEP print fluid. In an example each of the photoconductive elements 1-n is to apply one of a set of image separations 1-n upon the ITM belt utilizing the LEP printing fluid colors 1-n. The set of photoconductive elements 1-n are to apply the separations 1-n in alignment with and at least partially overlapping each other, such that the sum or accumulation of the applied separations 1-n forms a complete, e.g. multi-colored, image. In examples, after the heated ITM belt has acquired each of at least partially overlapping separations 1-n, the ITM belt is to transfer the resulting completed image in one pass as a molten film to the substrate.

A challenge when conducting LEP printing is to evaporate the carrier fluid from the ITM in a manner that will avoid and/or contain any combustion, and yet be efficient in terms of operating costs and press space. Existing carrier fluid evacuation systems (e.g., systems for printing devices with a single photoconductive element and an ITM on a drum) are often designed to maintain a ¼ LEL for carrier fluid concentration during printing and carrier fluid evaporation. Attempts to scale such existing systems to a printing device that includes an ITM belt and multiple photoconductive elements can result in a printing device footprint and/or operating costs that are undesirable.

To address these issues, various examples described in more detail below provide a device and a method for heat exchange and flame arrest that enable use of a reduced gas evacuation flow, e.g. carrier fluid gas evacuation flow, at a LEP printing device, relative to current processes.

In examples of the disclosure, a heat exchange and flame arrest ("HEFA") device is for use with a subject gas. The HEFA includes tubing arranged to traverse a core. The tubing defines a cooling fluid pathway. The core includes a gas flow inlet, a set of cooling fins, and a gas flow outlet. The gas flow inlet, the set of cooling fins, and the gas flow outlet collectively form a gas flow pathway for a subject gas. Each cooling fin of the set of cooling fins is positioned to form a gap between that cooling fin and an adjacent cooling fin. In an example, each cooling fin of the set of cooling fins is arranged lengthwise relative to the second gas flow pathway. The subject gas is to enter the gas flow inlet. The combination of the gap between each cooling fin of the set and the cooling capacity of the cooling fluid pathway is sufficient to, if the subject gas has ignited, lower temperature of the subject gas to below autoignition temperature. In examples, the gap between cooling fins may be greater than a published maximum experimental safe gap ("MESG") for the subject gas. In other examples, the gap may be less than MESG for the subject gas.

In examples, the HEFA device may include a liquid coolant flow inlet connected to the tubing at a first end of the cooling fluid pathway and a liquid coolant flow outlet connected to the tubing at a second end of the cooling fluid pathway. The liquid coolant is to enter the cooling fluid pathway via the coolant flow inlet and to exit the cooling fluid pathway via the coolant flow outlet. In examples, lengths of the tubing may be arranged horizontally within the core to enable a multi-pass parallel-and-counter cross flow relative to the gas flow pathway.

In certain examples, the HEFA device may include a second core with the second core having its own gas flow inlet, set of cooling fins, and second gas flow outlet. The second gas flow inlet, the second set of cooling fins, and the second gas flow outlet collectively form a second gas flow pathway that is line with and downstream of the first gas flow pathway. In an example, each cooling fin of the second set of cooling fins is arranged lengthwise relative to the second gas flow pathway. Each cooling fin of the second set of cooling fins is positioned to form a gap between that cooling fin and an adjacent cooling fin. In these examples, the subject gas is to exit the first core and enter the second gas flow inlet of the second core at a temperature below an autoignition temperature. The cooling capacity of the second fluid pathway is thus optimized to condense the subject gas.

In an example where the HEFA device includes a first and a second core, the first tubing of the first core and the second tubing of the second core are connected via a shared tubing portion.

In another example where the HEFA device includes a first and a second core, the first tubing of the first core and the second tubing of the second core are not connected. In a particular example, a first cooling fluid is to be circulated in the first cooling fluid pathway, and a second cooling fluid is to be circulated in the second cooling fluid pathway.

In another example where the HEFA device includes a first core and a second core, lengths of the tubing are arranged vertically within the core to enable orthogonal cooling fluid flow relative to the gas flow pathway.

Examples described herein provide a method for providing heat exchange and flame arrest for a subject gas. In an example of the disclosure, a cooling fluid is directed along a cooling fluid pathway defined by tubing positioned to traverse a core element. The core element is to have a gas flow inlet, a set of cooling fins, and a gas flow outlet. A subject gas is directed along a gas flow pathway formed by the gas flow inlet, the set of cooling fins, and the gas flow outlet. The gas flow inlet is to receive the subject gas. A combination of a gap between each of the cooling fins of the set and the cooling fluid moving along the cooling fluid pathway acts to cool the subject gas so as to extinguish any spark or flame that may occur or exist in the gas flow pathway, and so as to at least partially condense the subject gas. In a particular example, the gap between each cooling fin of the set is greater than a published MESG for the subject gas.

In a certain example of the method for providing heat exchange and flame arrest for a subject gas, a mixing zone is fluidly connected to the gas flow inlet of the HEFA device. The mixing zone is also in fluid connection with an evaporation channel within a printing device, the evaporation channel defined in part by a surface of an ITM, and a nozzle of an air knife heated by a heat source. In this certain example the method includes directing the subject gas along the evaporation channel, into the mixing zone, and then into the gas flow inlet of the HEFA device.

Examples of the disclosure provide for a gas evacuation system for a printing device that incorporates a HEFA device for use with a subject gas, e.g. a carrier fluid gas caused by evaporation of carrier fluid from an ITM of the printing device. The gas evacuation system includes an evaporation channel defined in part by a surface of the ITM, a nozzle of an air knife heated by a heat source, and a mixing zone, wherein the mixing zone is connected to a gas flow inlet. The core includes the gas flow inlet, a set of cooling fins, and a gas flow outlet. The gas flow inlet is for receiving a subject gas. The gas flow inlet, the set of cooling fins, and the gas flow outlet collectively form a gas flow pathway. Each cooling fin of the set of cooling fins is positioned to form a gap between that cooling fin and an adjacent cooling fin, with the gap being greater than the quenching diameter for the subject gas. In an example, each cooling fin of the set of cooling fins is arranged longitudinally relative to the gas flow pathway. The tubing is arranged to traverse the core, and defines a cooling fluid pathway. The combination of the gap between each cooling fin of the set of cooling fins, and the cooling capacity of the cooling fluid pathway, is sufficient to lower temperature of the subject gas to below a kindling point, and to at least partially condense the subject gas. In examples, the gas evacuation system includes a cooling fluid direction engine to control a first pressure component to direct the cooling fluid along the cooling fluid pathway, and a gas direction engine to control a second pressure component to direct the subject gas along the gas flow pathway.

In this manner the disclosed HEFA device and method enable safe and efficient operation of a LEP press or any other device that has a gas evacuation system. The disclosed HEFA device is to act as a flame arrestor as well as a condenser, such that any flame that occurs in the gas evaporation channel will be sucked into the HEFA and will not exit it due to the combination of the gaps between the cooling fins and the cooling capacity of the HEFA that will cool the subject gas to below autoignition temperature. In normal conditions where there is no flame, the HEFA device 100 will condense the subject gas. Users and providers of LEP printer systems, and of other systems that include evaporation and gas evacuation components, will appreciate that this disclosure enables a carrier fluid evacuation architecture that maintains operator safety and avoids system damage, while having a reduced system footprint and cost, greater efficiency, and improved cleanliness (gas escape in the atmosphere is minimized). Installations and utilization of printers and other devices that include the disclosed apparatus and methods should thereby be enhanced.

Figure 1:
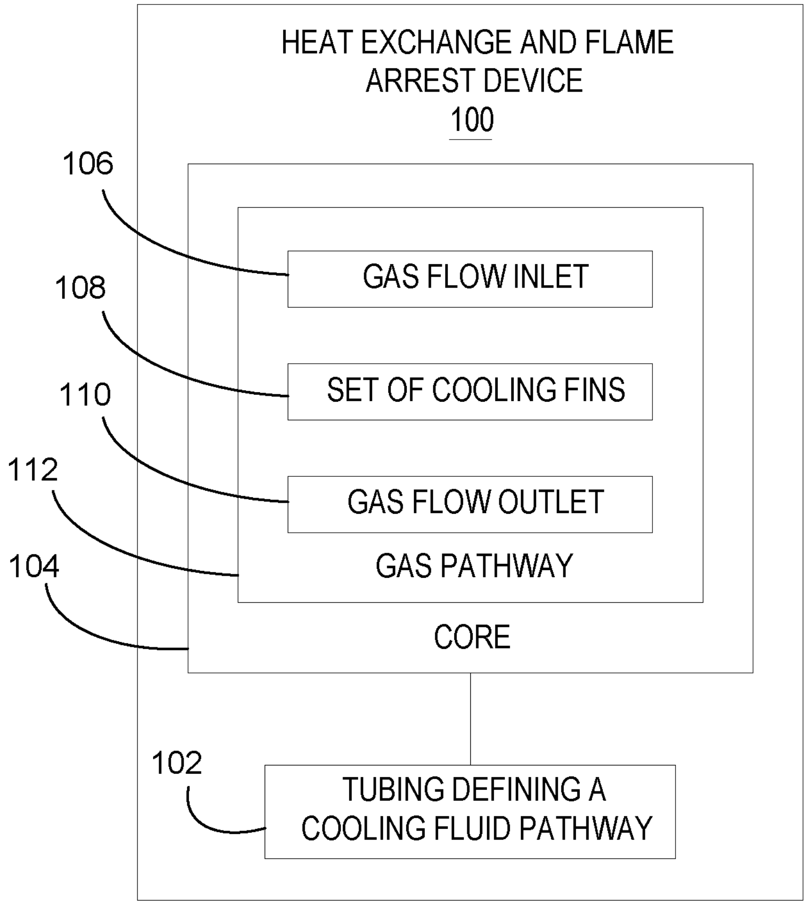
FIG. 1 is a block diagram depicting an example of a heat exchange and flame arrest device.

FIG. 1 illustrates an example of a heat exchange and flame arrest ("HEFA") device 100. In this example, HEFA device 100 is for use with a subject gas and includes tubing 102 that is arranged to traverse a core 104. The tubing defines a cooling fluid pathway for the cooling fluid. As used herein, "tubing" refers generally to a length or lengths of metal, plastic, glass, etc., for conveying a substance, e.g. a fluid.

As used herein, a "core" refers generally to an assembly of connected and/or fluidly connected components. In an example, the core 104 includes a gas flow inlet 106, a set of cooling fins 108, and a gas flow outlet 110. In examples, the cooling fins, the flow inlet and/or the gas flow outlet may be constructed of a metal, e.g. aluminum, copper, or steel. In other examples, the cooling fins, the gas flow inlet and/or the gas flow outlet may be constructed of a plastic that is capable of withstanding high temperatures, e.g., up to 1700 C for a short period of time. In certain examples, such plastic components are to be replaced after a flame arrest event.

The gas flow inlet 106, the set of cooling fins 108, and the gas flow outlet 110 of the core 104 collectively form a gas flow pathway 112 for a subject gas. In a particular example, the subject gas is vapor from the heating and evaporation of a hydrocarbon solvent carrier fluid that is part of an LEP printing fluid. In an example, each cooling fin of the set 108 is positioned to form a gap between that cooling fin and an adjacent cooling fin. The subject gas is to enter, and be received by, the gas flow inlet 106. The combination of the gap between each cooling fin of the cooling fin set 108 and the cooling capacity of the cooling fluid pathway 112 is sufficient to, if the subject gas has ignited, lower temperature of the subject gas to below autoignition temperature. As used herein, "autoignition temperature" refers generally to a temperature at which a vapor of a flammable material (e.g., a subject gas) can spontaneously ignite when mixed with air without a power source (also known as an ignition source). Autoignition temperature is sometimes referred to as a "kindling point." If a subject gas does ignite, the flame can be suppressed by reducing the temperature of the subject gas to below the autoignition temperature. Autoignition is to be distinguished from flash point. As used herein, "flash point" refers generally to a lowest temperature at which a material or vapor (e.g., a subject gas) is flammable when mixed with air and a power source.

In examples of the disclosure, the cooling capacity and/or dimensions of the HEFA core 104 are sufficient enough that the HEFA device is capable of lowering the temperature of a the subject gas to below autoignition temperature even if the gap between the fins of the set of fins 108 is greater than a published MESG for the subject gas. As used herein "MESG" refers generally to a measurement, e.g., a standardized measurement, of how easily a gas flame will pass through a narrow gap bordered by heat-absorbing metal. MESG can be used to classify or quantify flammability attributes of gases for during the design and/or selection of systems where ignition or combustion is a consideration. MESG may in some implementations may referred to as a "quenching diameter." In an example, an evaporated synthetic isoparaffinic hydrocarbon solvent that is, or is included in a carrier fluid for LEP printing fluid may have a published MESG of approximately 1 mm (e.g., in examples published MESG is 0.94 mm for n-octane, 1.05 mm for n-decane).

In examples, having the gap between the cooling fins at greater than MESG will help avoid pressure issues within the HEFA device 100. A greater gap between fins makes it easier to direct gas through the HEFA device, and thus reduces pressure drop of the HEFA device. In examples, the gas velocity is small enough such that the HEFA device can efficiently perform both its flame arrest and carrier fluid condensation functions.

In another example of the disclosure, the dimensions of the core 104 are such that the HEFA device 100 is capable lowering the temperature of the subject gas to below autoignition temperature wherein the gap between the fins 108 is less than a published MESG for the subject gas. This latter arrangement allows for a system with a core 104 with less tubing defining a cooling fluid pathway and/or with lesser dimensions than in the example where the gap between each fin of the set of fins 108 is greater than MESG.

Figure 2:
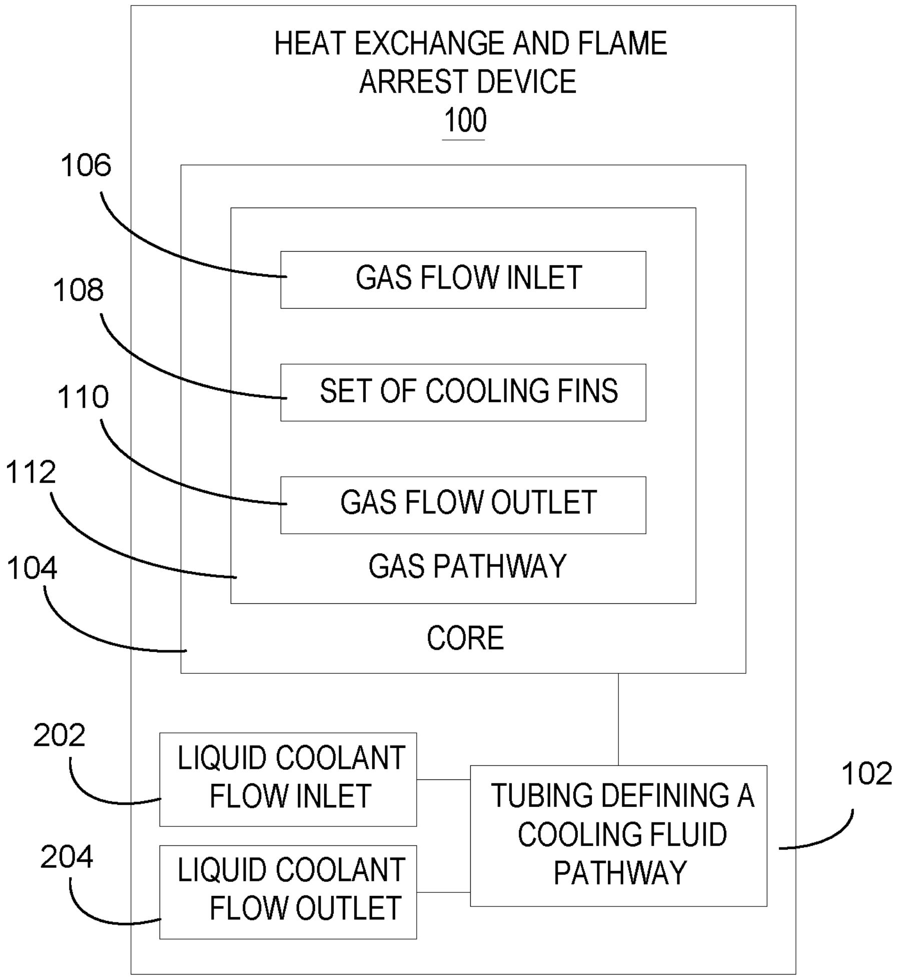
FIG. 2 is block diagram depicting another example of a heat exchange and flame arrest device.

FIG. 2 is block diagram depicting another example of a heat exchange and flame arrest device. In this example, the HEFA device 102 includes a liquid coolant flow inlet 202 connected to the tubing 102 at a first end of the cooling fluid pathway, and includes a liquid coolant flow outlet 204 connected to the tubing 102 at a second end of the cooling fluid pathway. With this arrangement, the liquid coolant is to enter the cooling fluid pathway via the liquid coolant flow inlet 202 and to exit the cooling fluid pathway via the liquid coolant flow outlet 204. In examples this arrangement of the liquid coolant flow inlet 202 fluidly connect to the tubing 102 adjacent to a top third of the core 104 and the liquid coolant flow outlet 204 fluidly connect to the tubing 102 adjacent to the bottom third of the core 104 is advantageous because it allows for a gravity assist with the flow of coolant through the tubing 102.

Figure 3:
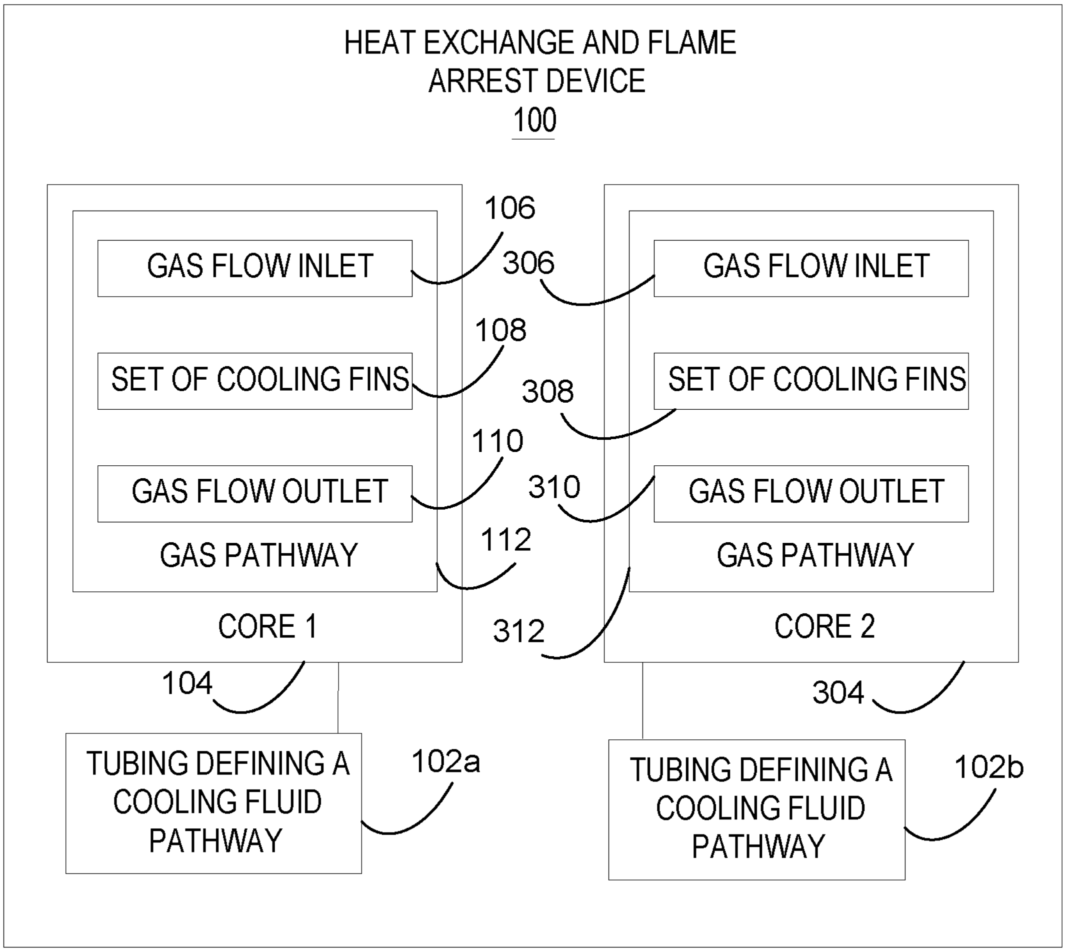
FIG. 3 is block diagram depicting another example of a heat exchange and flame arrest device.

FIG. 3 is block diagram depicting another example of a heat exchange and flame arrest device. In this example, the HEFA device 100 includes a first core 104 that is substantially similar to the core 104 of FIG. 1, and also includes a second core 304. First core 104 and second core 304 are connected by the tubing 102 that defines the cooling fluid pathway. In an example, first tubing **102*a* is arranged to traverse both the first core 104 to define a first cooling fluid pathway and second tubing 102*b* is arranged to traverse the second core 304 to define a second cooling fluid pathway. Other arrangements of tubing 102, including, but not limited to having a shared tubing portion connect or traverse the first 104 and second 304** cores, are possible and contemplated by this disclosure.

In a particular example, addition to the components of first core 104 discussed with respect to FIG. 1, the example of HEFA device 100 at FIG. 3 includes second core 304 with its own gas flow inlet ("second gas flow inlet" 306), with its own set of cooling fins 308 ("second set of cooling fins" 308) and with its own gas flow outlet ("second gas flow outlet" 310). The second gas flow inlet 310, the second set of cooling fins 308, and the second gas flow outlet 310 collectively form a second gas flow pathway 312 that is line with and downstream of the first gas flow pathway.

In an example, each cooling fin of the second set of cooling fins 308 is arranged lengthwise relative to the second gas flow pathway. In an example, each cooling fin of the second set of cooling fins 308 is positioned to form a gap between that cooling fin and an adjacent cooling fin of the second set 308. The subject gas is to enter the second gas flow inlet 306 at a temperature that is below an autoignition temperature, as the first set of cooling fins 108 and the gas flow pathway 112 of the first core 104 have already affected the temperature of the subject gas to keep the temperature below a autoignition temperature by the time the gas exits the first gas flow outlet 110 and enters the second gas flow inlet 306. In this manner, in an example the cooling capacity of the second fluid pathway 312 of the second core 304 is for condensing the subject gas, versus the flame arrest and condensation function of the first core 302, and may be optimized accordingly.

Figure 4A:
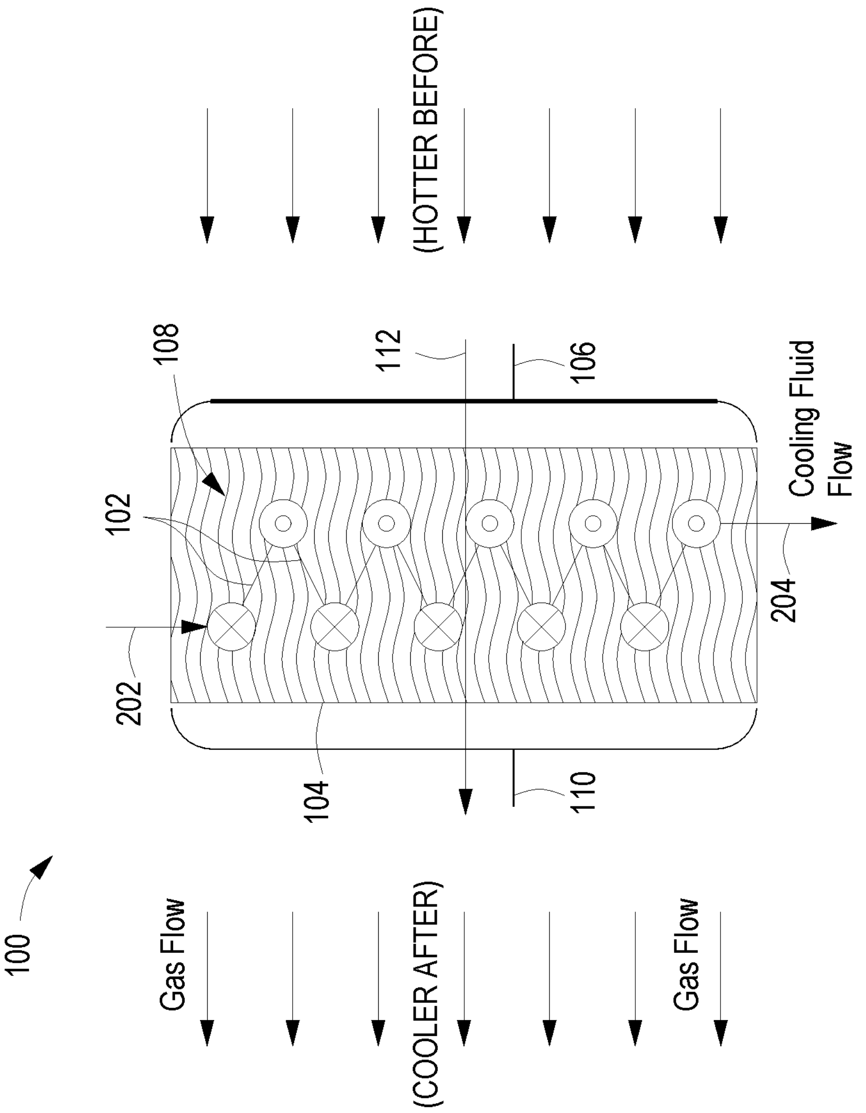
Figure 4B:
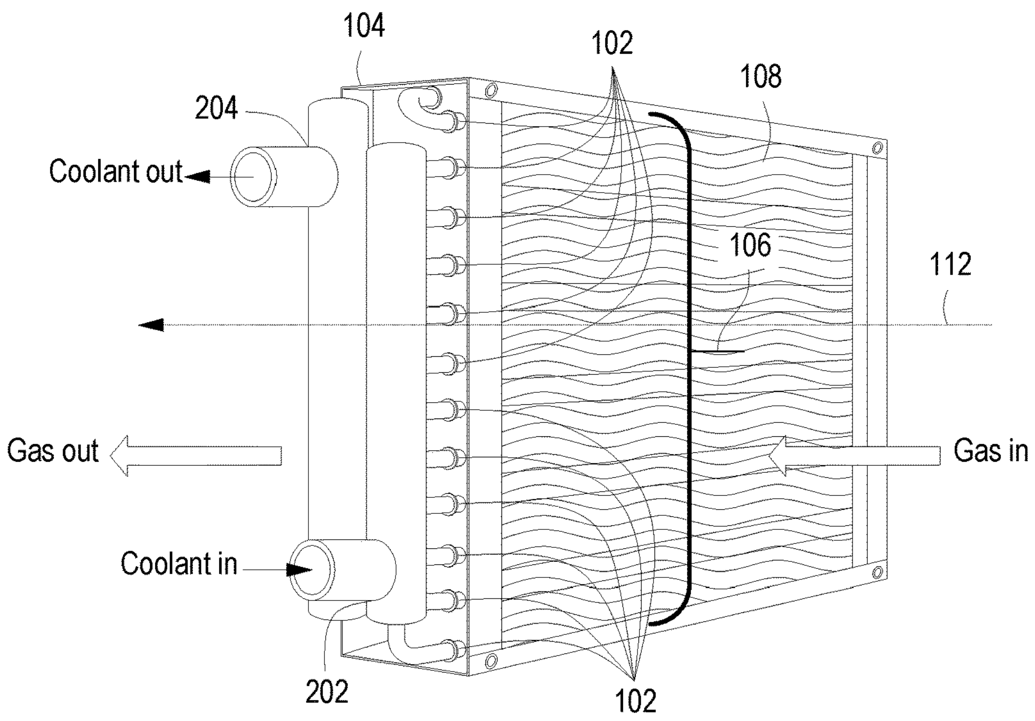
Figure 4C:
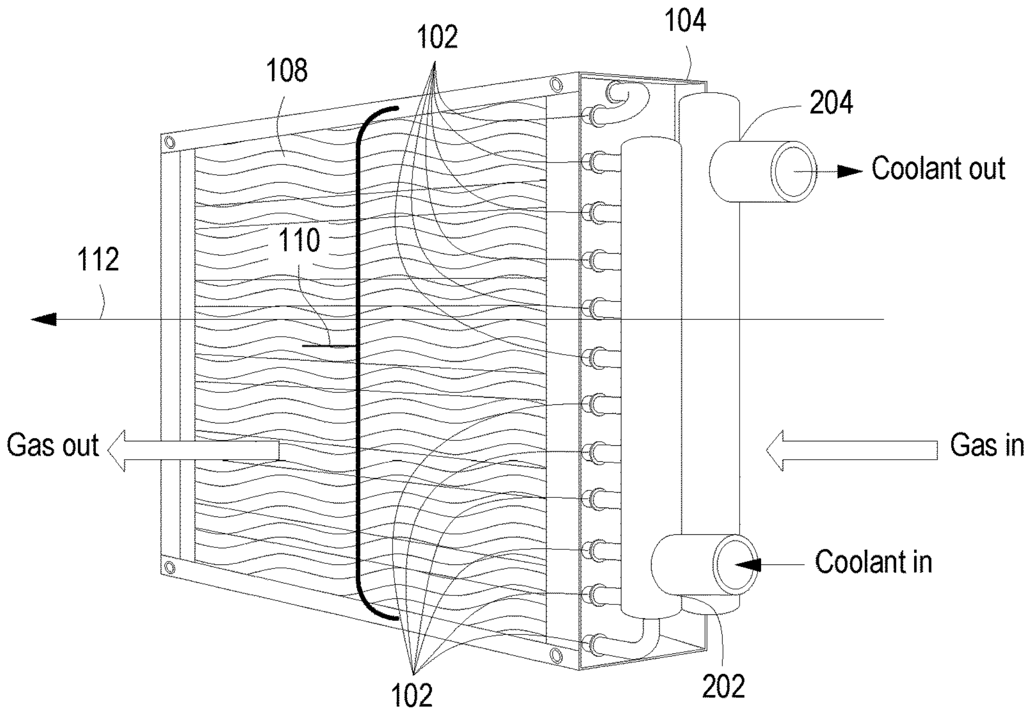

FIGS. 4A, 4B, 4C, and 4D are simple schematic diagrams that illustrate examples of a heat exchange and flame arrest device. FIGS. 4B and 4C depict opposite sides of an example HEFA device. Beginning at FIGS. 4A, 4B, and 4C, in these examples, a HEFA device 100 includes a core 104 and tubing 102 that is arranged so to traverse the core. The tubing 102 defines a pathway through which a cooling fluid is to pass. The core 104 includes a gas flow inlet 106, a set of cooling fins 108, and a gas flow outlet 110 that collectively form a gas flow pathway 112 for a subject gas, e.g. an evaporated hydrocarbon solvent carrier fluid for an LEP ink. In these examples, lengths of the tubing 102 are arranged horizontally within the core 104, parallel to one another, and with some of the lengths of the horizontal tubing offset in a lateral direction relative to other horizontal tubing, thereby enabling a multi-pass parallel-and-counter cooling fluid cross flow relative to the gas flow pathway 112.

Figure 4D:
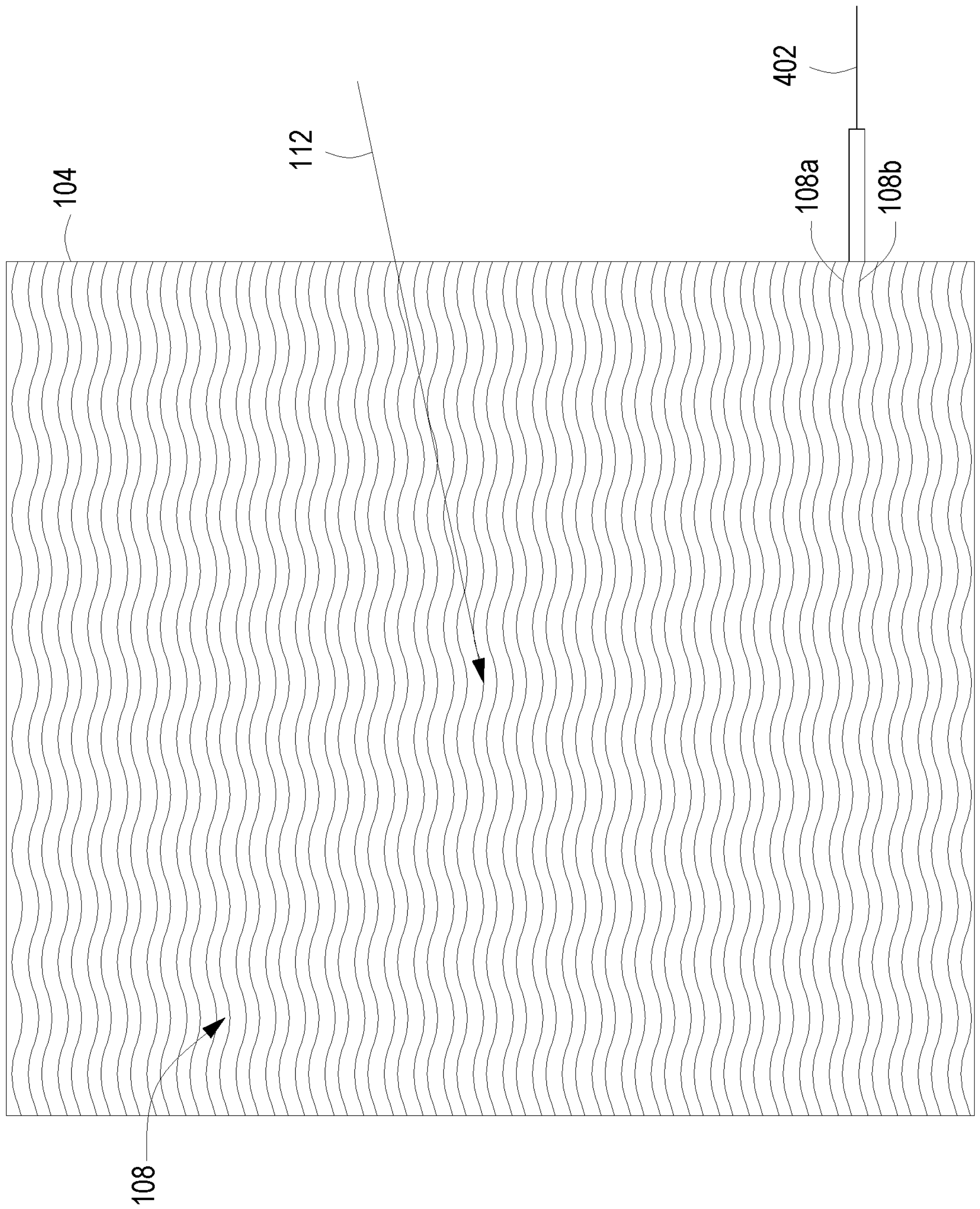

FIG. 4D provides a close-up view of the set of cooling fins 108 of FIGS. 4A, 4B, and 4C. In this example, a gap 402 exists between a first cooling fin 108*a* and an adjacent cooling fin 108*b* of the set of cooling fins 108. A gap likewise exists between each of the other cooling fins of the set of cooling fins 108. In examples the gap may be greater than the published MESG for the subject gas. In this example, the set of fins is arranged lengthwise relative the gas flow pathway 112.

Returning to FIGS. 4A, 4B, and 4C, the gas flow inlet 106 is for receiving the subject gas. The combination of the gap 402 between each cooling fin of the set of cooling fins and the cooling capacity of the cooling fluid pathway defined by the tubing 102 is sufficient to, if the subject gas has ignited, lower temperature of the subject gas to below an autoignition temperature. In examples, a multi-pass parallel-and-counter cooling fluid cross flow relative to the gas flow pathway and the dimensions of the core 104 can create a cooling capacity that, in combination with the set of fins 108, is sufficient to provide flame arresting properties at the HEFA device 100 notwithstanding that that the gap 402 between the fins of the set of fins 108 is greater than MESG.

FIG. 5 is a simple schematic diagram that illustrates an example of a heat exchange and flame arrest device. In this example a HEFA device 100 for use with a subject gas includes a core 104 with a gas flow inlet 106, a set of cooling fins 108 108*a* 108*b* and a gas flow outlet. In the example of FIG. 5, the gas flow outlet 110 is situated at the side of the core 104 that is directly opposite the side of the core 104 that has the gas flow inlet 106. In this example, the gas flow inlet 106, the set of cooling fins 108 108*a* 108*b*, and the gas flow outlet collectively and sequentially form a gas flow pathway 112. Each cooling fin 108 108*a* 108*b* of the set of cooling fins is arranged longitudinally relative to the gas flow pathway 112, and is situated so as to form a gap between that cooling fin and an adjacent cooling fin. For instance, in this example, such a gap 402*a* is illustrated between first cooling fin 108*a* and second cooling fin 108*b*. In this example, the gap 402*a* between cooling fins 108*a* and 108*b*, and between each of the cooling fins 108 is greater than quenching diameter for the subject gas.

In the example of FIG. 5, the core 104 includes tubing 102 arranged to traverse the core 104 with horizontal lengths, with the tubing defining a pathway for cooling fluid. In this example the cooling fluid is to enter the cooling fluid pathway defined by the tubing 102 via a liquid coolant flow inlet 202, and is to exit the cooling fluid pathway via the liquid coolant fluid flow outlet 204. The combined cooling effect of the gaps (e.g. gap 402*a*) between each cooling fin 108 108*a* 108*b* of the set of the cooling fins, and the cooling capacity of the coolant flowing through the cooling fluid pathway provided by the tubing 102 is to lower temperature of the subject gas to below a kindling point. In examples, this combined cooling effect is also to at least partially condense the subject gas such that the condensed subject gas may be reused. In a particular example, the subject gas is a hydrocarbon solvent carrier fluid vapor, and the condensed carrier fluid may be reused at a printing press (e.g., combined with colorant particles to form an LEP printing fluid) for use in a printing operations at the printing press.

FIG. 6 is a simple schematic diagram that illustrates another example of a heat exchange and flame arrest device. In this example, the HEFA device 100 is similar to the HEFA device of FIG. 5, but adds a second core 304 that includes a second gas flow inlet 306 that abuts the gas flow outlet 110 of the first core 104, a second set of cooling fins 308 308*a* 308*b*, and a second gas flow outlet 310. The second gas inlet 306, the second set of cooling fins 308 308*a* 308*b*, and the second gas outlet 310 collectively form a second gas flow pathway 312 that is line with and downstream of the first gas flow pathway 112.

Each cooling fin of the second set of cooling fins 308 308*a* 308*b* is arranged lengthwise relative to the second gas flow pathway 312. Each cooling fin of the second set of cooling fins is positioned to form a gap between that cooling fin and an adjacent cooling fin (see, e.g., the gap 402*b* between a first cooling fin 308*a* and a second cooling fin 308*b* of the second set of cooling fins. The subject gas is to enter the second gas flow inlet at a temperature below an autoignition temperature. The cooling capacity of the tubing traversing the second core is to at least partially condense the subject gas.

In examples, the HEFA device 100 includes tubing arranged to traverse both the first core 104 and the second core 304 to define cooling fluid pathways. In this example, the HEFA device includes first tubing 102*a* arranged to traverse the first core 104, and includes second tubing 102*b* arranged to traverse the second core 304 and defining a first cooling pathway, and the second tubing arranged to traverse the second core 304 and defining a second cooling fluid pathway. In this example, the first tubing 102*a* of the first core and the second tubing 102*b* of the second core 304 are connected via a shared tubing portion 602.

In the example of FIG. 6, cooling fluid is to enter the second cooling fluid pathway defined by the second tubing 102*b* via a liquid coolant flow inlet 202 that is located within the top third of the second core 304 and is fluidly connected to the second tubing 102*b*. The cooling fluid is to exit the first cooling fluid pathway defined by the first tubing 102*a* via a liquid coolant flow outlet 204 that is located at the bottom third of the first core 104 and is fluidly connected to the second tubing 102*b*. This arrangement of the allows for a gravity assist with the flow of the coolant through the first and second tubing 102*a* 102*b*, while having the liquid coolant at its lowest temperature as it flows through the second tubing 102*b* traversing the second core 304. This can be advantageous in examples where the first gap 402*a* between the fins of the first set of fins 108 108*a* 108*b* is less than MESG such that the fins by themselves have a flame arrest property, and the liquid coolant flow is optimized for the condensing function of the HEFA device 100. In certain examples where the first gap 402*a* between the fins of a first core 104 are less than published MESG for the subject gas, a first depth 604 of the first core 104 relative to the direction of the gas flow along the first and second gas flow pathways 112 312 can be less than a second depth 606 of the second core 304, in order to optimize the condensation function of the second core 304 of the HEFA device 100. This arrangement may be appropriate for situations where the temperature of the gas is not uniform, e.g. not uniform from top to bottom, as the gas enters the HEFA device 100, and it is desirable to increase the cooling efficiency. In this example, a temperature reading taken at the core at location T1 652 would be approximately equal to a temperature reading taken at location T4 658, and a temperature reading taken at the core at location T2 654 would be approximately equal to a temperature reading taken at location T3 656.

FIG. 7 is a simple schematic diagram that illustrates another example of a heat exchange and flame arrest device. In this example, the HEFA device 100 is similar to the HEFA device of FIG. 6, in that the device includes second tubing 102*b* arranged to traverse the second core 304, wherein the second tubing 102*b* defines a second cooling fluid pathway. A difference between the examples of FIGS. 6 and 7 is that cooling fluid inlet 202 of FIG. 7 is situated at the top third of the second core 304 rather that at the bottom third of the second core 304 as in FIG. 6. Another difference is that the cooling fluid outlet 204 of FIG. 7 is situated at the top third of the first core 104 rather than at the bottom third of the first core as in in FIG. 6. This arrangement may be appropriate for situations where the temperature of the gas is uniform, e.g. uniform from top to bottom, as the gas enters the HEFA device 100, In this example, a temperature reading taken at the core at location T1 652 would be less than a temperature reading taken at location T2 654, which would be less than temperature reading taken at the core at location T3 656, which would be less than a temperature reading taken at location T4 658.

FIG. 8 is a simple schematic diagram that illustrates another example of a heat exchange and flame arrest device. In this example, the HEFA device 100 is similar to the HEFA device of FIG. 6, but each of the first core 104 and the second core 304 have their own dedicated liquid cooling tubing, cooling fluid inlets, cooling fluid outlets. Thus, in the example of FIG. 8 the HEFA device 100 includes second tubing 102*b* arranged to traverse the second core 304 to define a second cooling fluid pathway, with the first tubing 102*a* of the first core 104 and the second tubing 102*b* not being connected. This arrangement allows for use of a different cooling fluid for circulating through the first cooling fluid pathway, than the cooling fluid to be circulated through the second cooling fluid pathway. In this manner, the cooling fluids to can be optimized according to the primary function of the first and second cores 104 304. For instance, a first cooling fluid might be chosen for circulation through the first tubing 102A of the first core 104 according to how effectively that first cooling fluid complements the effect of the gap between the fins 108 108*a* 108*b* of the first core 104 in performing a flame arrest function. Similarly, a second cooling fluid might be chosen for circulation through the second tubing 102*b* of the second core 304 according to how effectively that second cooling fluid complements the effect of the gap between the fins 308 308*a* 308*b* of the second core 304 in effecting a partial or complete condensation of the subject gas.

FIG. 9 is a simple schematic diagram that illustrates another example of a heat exchange and flame arrest device. In this example, the HEFA device 100 is similar to the HEFA device of FIG. 8, but here lengths of the second tubing 102*b* are arranged vertically within the core to enable an orthogonal cooling fluid flow relative to the gas flow pathway.

FIGS. 10 and 11 depict examples of physical and logical components for implementing various examples. In FIGS. 10 and 11 various components are identified as engines 1052 and 1054. In describing engines 1052 and 1054 focus is on each engine's designated function. However, the term engine, as used herein, refers generally to hardware and/or programming to perform a designated function. As is illustrated later with respect to FIG. 12, the hardware of each engine, for example, may include one or both of a processor and a memory, while the programming may be code stored on that memory and executable by the processor to perform the designated function.

FIGS. 10 and 11 are simple schematic diagram that illustrates an example of a gas evacuation system, including a heat exchange and flame arrest device, for a printing system. The gas evacuation system 1000 includes an evaporation channel 1002 defined in part by a surface of an intermediate transfer member ("ITM") 1004, a nozzle 1006 of an air knife, the air knife heated by a heat source, and a mixing zone 1008. The ITM 1004 defines a top boundary of the evaporation channel 1002, and a mechanical structure 1010 or set of mechanical structures define a bottom boundary of the evaporation channel 1002.

The air knife 1006 defines a starting point, and the mixing zone 1008 defines an ending point, for the evaporation channel 1002 in relation to direction of flow of the subject gas. In examples, the gas evacuation system 1000 is open to atmospheric pressure both upstream 1060 and downstream 1070 of the evaporation channel 1002.

In an example the subject gas is an evaporated hydrocarbon solvent carrier fluid vapor that is the result of evaporation of liquid carrier fluid in the evaporation channel. In an example, the evaporated hydrocarbon solvent carrier fluid moves along a boundary defined by the ITM 1004 and the mechanical structure 1010, towards the air knife nozzle 1006 at a "cool state" temperature 1030*a* of approximately 100 C. When the evaporated carrier fluid reaches the air knife nozzle 1006 that provides a heated gas stream of approximately 200 C, and in some examples is heated by additional heating elements (e.g. heat lamps 1108 of FIG. 11) some or all of the hydrocarbon solvent may attain a hot state 1032 wherein the temperature of the subject gas rises to between 130 C and 230 C. In examples a hot state temperature, conducive for rapid evaporation of the hydrocarbon solvent gas, is maintained as the gas moves through the evaporation channel 1002 and into the mixing zone 1008. The hydrocarbon solvent gas is raised to its highest temperature, a temperature above flash point yet below autoignition temperature, at the point of the air nozzle at the beginning of the evaporation channel 1002.

The mixing zone 1008 is so named because this is a zone for mixing of the hot subject gas that is received from the evaporation channel, and a cool gas 1030*b* (e.g. air, or subject gas mixed with air) that is to enter the mixing zone from a source other than the evaporation channel 1002. In an example, this cool state gas may enter the mixing chamber from a direction opposite that the hot state subject gas is moving.

The mixing zone 1008 is fluidly connected to a gas flow inlet 106 of a HEFA device 100. The HEFA device 100 includes a core 104 including the gas flow inlet 106, a set of cooling fins 108, and a gas flow outlet 110. The gas flow inlet 106, the set of cooling fins 108, and the gas flow outlet 110 collectively form a gas flow pathway 112.

The gas flow inlet 106 is for receiving the subject gas from the mixing zone 1008. In an example, each cooling fin of the set of cooling fins is arranged longitudinally relative to the gas flow pathway, and is positioned to form a gap between that cooling fin and an adjacent cooling fin. In this example, the gap between each cooling fin of the set is to be greater than quenching diameter for the subject gas. The HEFA device 100 includes tubing 102 arranged to traverse the core 104 and to pathway for the flow of cooling fluid. The combination of the influence of the gap between each cooling fin of the set, and the cooling capacity of the cooling fluid pathway, upon the subject gas as the subject gas is directed through the gas pathway 112 is sufficient to lower temperature of the subject gas to below a kindling point in the event of an ignition (a flame arrest function), and to at least partially condense the subject gas (a condensation function).

In the examples of FIGS. 10 and 11, the gas evacuation system 1000 includes a cooling fluid direction engine 1052 and a gas direction engine 1054. The cooling fluid direction engine 1052 represents generally a combination of hardware and programming to cause a cooling fluid to be directed along the cooling fluid pathway defined by the tubing 102 that is positioned to traverse the core element 104. In examples a first pressure component, e.g. a pump 1012 or other electromechanical apparatus to effect a positive or negative pressure, may be utilized to direct the cooling fluid along the cooling fluid pathway.

The gas direction engine 1054 represents generally a combination of hardware and programming to cause directing of a subject gas along the gas flow pathway 112 that is formed by the gas flow inlet 106, the set of cooling fins 108, and the gas flow outlet 110. In examples, the cooling fluid direction engine 1052 may control a second pressure component to effect a positive pressure (e.g. a pump or similar positive pressure electromechanical device) or a negative pressure (e.g. a vacuum or other negative pressure producing electromechanical device) upon the subject gas to direct the subject gas along the gas flow pathway 112.

In examples where the subject gas is a carrier fluid vapor, the gas evacuation system 1000 may include a reservoir 1016 to recover and store a volume of the carrier fluid (e.g. carrier fluid) that has been condensed via the HEFA device 100 and is now in a liquid state. Such recovered liquid carrier fluid may be then be reused in a printing operation (e.g., combined with colorant to form LEP ink for printing).

Referring to the particular example of FIG. 11, the gas evacuation system 1000 includes an air knife heat source 1106, heat lamps 1108, a substantially flat cover 1010' for the heat lamps, first and second photoconductors **1102*a* 1102*b*, an idler roller 1104, and condensed carrier fluid return conduit 1110**.

The air knife heat source 1106 is fluidly connected to the air knife nozzle 1006 and is for heating and moving the evaporated carrier fluid along the evaporation channel 1002. The heat lamps 1108 are to provide heat to the evaporation channel 1002 to enhance evaporation of the carrier fluid vapor 1002.

The mechanical structure that defines at bottom boundary of the evaporation channel 1002 is a substantially flat cover 1010' for a set of heat lamps 1108. In other examples, the heat source may be one or a combination from the set of a heat laser, a laser, and a LED. In examples, the heat source(s) may provide one or more from the set of IR, visible, or UV spectrum light.

In the example of FIG. 11, the ITM 1004 is an ITM belt in functional contact with a first photoconductor **1102*a* that is upstream of the gas evacuation system 1000, and a second photoconductor 1102*b* that is downstream of the gas evacuation system 1000, relative to the direction 1018 of the gas flow in the evaporation channel 1002. In examples the direction of gas flow 1018 in the evaporation channel is a same direction as a direction that the ITM 1004** is to travel. The first and second photoconductors are for applying layers of LEP printing fluid to the ITM according to a predetermined pattern, forming an inked image to be subsequently transferred from the ITM to a substrate.

In the example of FIG. 11, the gas evacuation system 1000 includes an idler roller 1104 that applies a pressure to the ITM 1004 such that the evaporation channel 1002 is maintained at a constant width, or a width of an accepted range. In this example, a carrier fluid return 1110 is a piping or conduit for transfer of condensed carrier fluid from the condensation container 1016 to a mixing chamber. In this manner the condensed carrier fluid may be combined with colorant particles to form an LEP printing fluid and thus reused in printing operations at a printing press.

It should be noted that while FIG. 11B illustrates a gas evacuation system 1000, including a HEFA device, for a printing system wherein the ITM 1004 is an ITM belt positioned for functional contact with multiple photoconductors, the teachings of the present disclosure are not so limited. The teachings of the present disclosure contemplate, and can be applied to, a gas evacuation system, including a HEFA device, for a printing system wherein the ITM is an ITM that is positioned for functional contact with a single photoconductor. Likewise, the teachings of this disclosure contemplate, and can be applied to, a gas evacuation system, including a HEFA device, for a printing system wherein the ITM is an ITM element that is mounted upon a rotatable drum, or where the ITM has the shape of a drum. Various other shapes and configurations of an ITM are possible and are contemplated by this disclosure.

In the foregoing discussion of FIGS. 10 and 11, engines 1052 and 1054 were described as combinations of hardware and programming. Engines 1052 and 1054 may be implemented in a number of fashions. Looking at FIG. 12 the programming may be processor executable instructions stored on a tangible memory resource 1280 and the hardware may include a processing resource 1290 for executing those instructions. Thus, memory resource 1280 can be said to store program instructions that when executed by processing resource 1290 implement the HEFA device 100 of FIGS. 1-11, or the gas evacuation system 1000 that incorporates the HEFA device.

Memory resource 1280 represents generally any number of memory components capable of storing instructions that can be executed by processing resource 1290. Memory resource 1280 is non-transitory in the sense that it does not encompass a transitory signal but instead is made up of a memory component or memory components to store the relevant instructions. Memory resource 1280 may be implemented in a single device or distributed across devices. Likewise, processing resource 1290 represents any number of processors capable of executing instructions stored by memory resource 1280. Processing resource 1290 may be integrated in a single device or distributed across devices. Further, memory resource 1280 may be fully or partially integrated in the same device as processing resource 1290, or it may be separate but accessible to that device and processing resource 1290.

In one example, the program instructions can be part of an installation package that when installed can be executed by processing resource 1290 to implement device 100. In this case, memory resource 1280 may be a portable medium such as a CD, DVD, or flash drive or a memory maintained by a server from which the installation package can be downloaded and installed. In another example, the program instructions may be part of an application or applications already installed. Here, memory resource 1280 can include integrated memory such as a hard drive, solid state drive, or the like.

In FIG. 12, the executable program instructions stored in memory resource 1280 are depicted as a cooling fluid direction module 1252 and a gas direction module 1254. Cooling fluid direction module 1252 represents program instructions that when executed by processing resource 1290 may perform any of the functionalities described above in relation to cooling fluid direction engine 1052 of FIGS. 10 and 11. Gas direction module 1254 represents program instructions that when executed by processing resource 1290 may perform any of the functionalities described above in relation to gas direction engine 1054 of FIGS. 10 and 11.

FIG. 13 is a flow diagram of implementation of a method for providing heat exchange and flame arrest for a subject gas. In discussing FIG. 13, reference may be made to the components depicted in FIGS. 1-12. Such reference is made to provide contextual examples and not to limit the way the method depicted by FIG. 13 may be implemented. A cooling fluid is directed along a cooling fluid pathway defined by tubing positioned to traverse a core element (block 1302). In certain examples, the gap is greater than MESG for the subject gas. Referring back to FIGS. 10-12, cooling fluid direction engine 1052 (FIGS. 10 and 11) or cooling fluid direction module 1252 (FIG. 12), when executed by processing resource 1290, may be responsible for implementing block 1302.

A subject gas is directed along a gas flow pathway formed by a gas flow inlet, a set of cooling fins, and a gas flow outlet of the core element. A combination of a gap between each of the cooling fins of the set and the cooling fluid moving along the cooling fluid pathway acts to cool the subject gas so as to extinguish any spark or flame that exists in the gas flow pathway and at least partially condense the subject gas (block 1304) Referring back to FIGS. 10-12, gas direction engine 1054 (FIGS. 10 and 11) or gas direction module 1254 (FIG. 12), when executed by processing resource 1290, may be responsible for implementing block 1304.

FIG. 14 is a flow diagram of implementation of a method for providing heat exchange and flame arrest for a subject gas. In discussing FIG. 14, reference may be made to the components depicted in FIGS. 1-12. Such reference is made to provide contextual examples and not to limit the way the method depicted by FIG. 14 may be implemented. A subject gas is directed along an evaporation channel, into a mixing zone that is in fluid connection with the evaporation channel, and into a gas flow inlet of a core element, and into the gas flow inlet. The evaporation channel is defined in part by a surface of an ITM of a printing device, and a nozzle of a heated air knife (block 1402) Referring back to FIGS. 10-12, gas direction engine 1054 (FIGS. 10 and 11) or gas direction module 1254 (FIG. 12), when executed by processing resource 1290, may be responsible for implementing block 1402.

A cooling fluid is directed along a cooling fluid pathway defined by tubing positioned to traverse the core element (block 1404). Referring back to FIGS. 10-12, cooling fluid direction engine 1052 (FIGS. 10 and 11) or cooling fluid direction module 1252 (FIG. 12), when executed by processing resource 1290, may be responsible for implementing block 1404.

The subject gas is directed along a gas flow pathway formed by the gas flow inlet, a set of cooling fins, and a gas flow outlet of the core element. The combination of a gap between each of the cooling fins of the set and the cooling fluid moving along the cooling fluid pathway acts to cool the subject gas so as to extinguish any spark or flame that exists in the gas flow pathway and at least partially condense the subject gas (block 1406) Referring back to FIGS. 10-12, gas direction engine 1054 (FIGS. 10 and 11) or gas direction module 1254 (FIG. 12), when executed by processing resource 1290, may be responsible for implementing block 1406.

FIGS. 1-14 aid in depicting the architecture, functionality, and operation of various examples. In particular, FIGS. 1-12 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A “processing resource” is an instruction execution system such as a computer/processor-based system or an ASIC (Application Specific Integrated Circuit) or other system that can fetch or obtain instructions and data from computer-readable media and execute the instructions contained therein. A “memory resource” is a non-transitory storage media that can contain, store, or maintain programs and data for use by or in connection with the instruction execution system. The term “non-transitory” is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 13 and 14 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A heat exchange and flame arrest ("HEFA") device for use with a subject gas, comprising:

tubing arranged to traverse a core, the tubing defining a cooling fluid pathway; and the core, including a gas flow inlet, a set of cooling fins, and a gas flow outlet;

wherein the gas flow inlet, the set of cooling fins, and the gas flow outlet collectively form a gas flow pathway for a subject gas;

wherein each cooling fin of the set is positioned to form a gap between that cooling fin and an adjacent cooling fin;

wherein the gas flow inlet is to receive the subject gas;

wherein the combination of the gap between each cooling fin of the set and the cooling capacity of the cooling fluid pathway is sufficient to, if the subject gas has ignited, lower temperature of the subject gas to below autoignition temperature.

2. The HEFA device of claim 1, wherein the gap is greater than maximum experimental safe gap ("MESG") for the subject gas.

3. The HEFA device of claim 1, wherein each cooling fin of the set is arranged lengthwise relative to the gas flow pathway.

4. The HEFA device of claim 1, further comprising a liquid coolant flow inlet connected to the tubing at a first end of the cooling fluid pathway and a liquid coolant flow outlet connected to the tubing at a second end of the cooling fluid pathway, wherein the liquid coolant is to enter the cooling fluid pathway via the liquid coolant flow inlet and to exit the cooling fluid pathway via the liquid coolant flow outlet.

5. The HEFA device of claim 1, wherein lengths of the tubing are arranged horizontally within the core to enable a multi-pass parallel-and-counter cross flow relative to the gas flow pathway.

6. The HEFA device of claim 1, wherein the core is a first core;

wherein the gas flow inlet is a first gas flow inlet, the set of cooling fins is a first set of cooling fins, the gas flow outlet is a first gas flow outlet, the cooling pathway is a first cooling pathway, and the gas flow pathway is a first gas flow pathway;

further comprising a second core with a second gas flow inlet, a second set of cooling fins, and a second gas flow outlet;

wherein the second gas flow inlet, the second set of cooling fins, and the second gas flow outlet collectively form a second gas flow pathway that is line with and downstream of the first gas flow pathway;

wherein each cooling fin of the second set is positioned to form a gap between that cooling fin and an adjacent cooling fin, wherein the subject gas is to enter the second gas flow inlet at a temperature below an autoignition temperature; and wherein the cooling capacity of the tubing situated in the second core is to at least partially condense the subject gas.

7. The HEFA device of claim 6, further comprising second tubing arranged to traverse the second core, the second tubing defining a second cooling fluid pathway, and wherein the first tubing of the first core and the second tubing of the second core are connected via a shared tubing portion.

8. The HEFA device of claim 6, further comprising second tubing arranged to traverse the second core, the second tubing defining a second cooling fluid pathway, and wherein the first tubing of the first core and the second tubing of the second core are not connected.

9. The HEFA device of claim 8, wherein a first cooling fluid is to be circulated in the first cooling fluid pathway, and a second cooling fluid is to be circulated in the second cooling fluid pathway.

10. The HEFA device of claim 8, wherein lengths of the second tubing are arranged vertically within the core to enable an orthogonal cooling fluid flow relative to the gas flow pathway.

11. A method for providing heat exchange and flame arrest for a subject gas, comprising:

directing a cooling fluid along a cooling fluid pathway defined by tubing positioned to traverse a core element;

directing a subject gas along a gas flow pathway formed by a gas flow inlet, a set of cooling fins, and a gas flow outlet of the core element, wherein a combination of a gap between each of the cooling fins of the set and the cooling fluid moving along the cooling fluid pathway acts to cool the subject gas so as to extinguish any spark or flame that exists in the gas flow pathway and at least partially condense the subject gas.

12. The method of claim 11, wherein the gap is greater than maximum experimental safe gap ("MESG") for the subject gas.

13. The method of claim 11, further comprising directing the subject gas along an evaporation channel, into a mixing zone that is in fluid connection with the evaporation channel and the gas flow inlet, and into the gas flow inlet, wherein the evaporation channel is defined in part by a surface of an intermediate transfer member ("ITM") of a printing device, and in part by a nozzle of a heated air knife.

14. A gas evacuation system for a printing device, comprising:

an evaporation channel defined in part by a surface of an intermediate transfer member ("ITM"), a nozzle of an air knife heated by a heat source, and a mixing zone, wherein the mixing zone is connected to a gas flow inlet of a heat exchange and fire arrest ("HEFA") device;

the HEFA device for use with a subject gas, the HEFA device including a core including the gas flow inlet, a set of cooling fins, and a gas flow outlet, wherein the gas flow inlet, the set of cooling fins, and the gas flow outlet collectively form a gas flow pathway;

wherein the gas flow inlet is for receiving the subject gas from the mixing zone;

wherein each cooling fin of the set is positioned to form a gap between that cooling fin and an adjacent cooling fin, the gap greater than quenching diameter for a subject gas; and tubing arranged to traverse the core, the tubing defining a cooling fluid pathway;

wherein the combination of the gap between each cooling fin of the set and the cooling capacity of the cooling fluid pathway is sufficient to lower temperature of the subject gas to below a kindling point, and to at least partially condense the subject gas.

15. The gas evacuation system for a printing device of claim 14, further comprising a cooling fluid direction engine to control a first pressure component to direct the cooling fluid along the cooling fluid pathway, and a gas direction engine to control a second pressure component to direct the subject gas along the gas flow pathway.

16. The HEFA device of claim 1, wherein the cooling fins are parallel to each other.

17. The method of claim 11, wherein the cooling fins are parallel to each other.

* * * * *